(12) United States Patent
Lee

(10) Patent No.: US 12,577,944 B2
(45) Date of Patent: Mar. 17, 2026

(54) GREASE BARREL PUMP FOR PREVENTING PRESENCE OF RESIDUAL GREASE WITH GREASE SPRAY FUNCTION AND VARIABLE GREASE DISCHARGE FUNCTION

(71) Applicant: AHWON CORPORATION, Gunpo-si (KR)

(72) Inventor: Juho Lee, Gwacheon-si (KR)

(73) Assignee: AHWON CORPORATION, Gunpo-si (KR)

( * ) Notice: Subject to any disclaimer, the term of this patent is extended or adjusted under 35 U.S.C. 154(b) by 0 days.

(21) Appl. No.: 18/929,464

(22) Filed: Oct. 28, 2024

(65) Prior Publication Data

US 2025/0137442 A1      May 1, 2025

(30) Foreign Application Priority Data

Oct. 31, 2023    (KR) ........................ 10-2023-0147618

(51) Int. Cl.
*F04B 13/00*        (2006.01)
*F04B 15/02*        (2006.01)
*F16N 13/02*        (2006.01)
(52) U.S. Cl.
CPC .............. *F04B 13/00* (2013.01); *F04B 15/02* (2013.01); *F16N 13/02* (2013.01)

(58) Field of Classification Search
CPC .......... F04B 13/00; F04B 15/02; F04B 19/22; F04B 53/10; F04B 53/16; F16N 13/02; F16N 13/04; B67D 7/645
See application file for complete search history.

(56) References Cited

FOREIGN PATENT DOCUMENTS

KR        20120122748  A  *  11/2012    ............. F16N 31/00
KR        10-1364760  B1    2/2014
KR        10-1689224  B1    12/2016
KR    10-2023-0067147  A    5/2023

* cited by examiner

*Primary Examiner* — Loren C Edwards
(74) *Attorney, Agent, or Firm* — Heedong Chae; Lucem, PC

(57)          ABSTRACT

One aspect of the present disclosure relates to a multipurpose grease barrel pump for preventing a presence of residual grease inside a grease barrel, which may easily adjust a discharge amount of grease, in which the multipurpose grease barrel pump is based on grease residue prevention type, has a branch and shock prevention structure, enables control (on/off) of a flow amount of the pump, and has a grease spray function, a function of periodically or continuously injecting a very small amount of the grease, and a typical pump function of discharging a large amount of the grease.

8 Claims, 9 Drawing Sheets

200

200

GREASE BARREL PUMP FOR PREVENTING PRESENCE OF RESIDUAL GREASE WITH GREASE SPRAY FUNCTION AND VARIABLE GREASE DISCHARGE FUNCTION

BACKGROUND

1. Field

One aspect of the present disclosure relates to a multi-purpose grease barrel pump for preventing a presence of residual grease inside a grease barrel, which may easily adjust a discharge amount of grease, and more specifically, to a multipurpose grease barrel pump, which 1) is based on a grease residue prevention type 2) has a branch and shock prevention structure, 3) enables control (on/off) of a flow amount of the pump, 4) has a grease spray function, and 5) has a function of discharging a very small amount of the grease and a function of discharging a large amount of the grease.

2. Description of Related Art

In general, a barrel-replacement type barrel pump replaces a grease barrel in a state in which the entire grease remaining in the grease barrel is not discharged, or refills the grease according to a lower limit level warning of a grease level gauge.

In this case, since a considerable amount of the grease remains in the grease barrel, it is difficult to treat the grease residue during the replacement of the barrel, and if care is not taken, there may be a case in which foreign matters are inserted into the grease so that the grease may not be used, and environmental pollution may be caused due to the foreign matters.

Therefore, in the case of the grease barrel-replacement type pump, when the grease barrel is replaced and used after using the entire grease inside the barrel, lubrication may be always performed using new grease, so that the grease may be supplied while maintaining the grease specifications at the time of manufacture.

In this regard, the present applicant discloses "Multifunctional grease level follow-type electric grease barrel pump and piping structure thereof" in Korean Unexamined Patent Publication No. 10-2023-0067147 (published on May 16, 2023), in which the multifunctional grease level follow-type electric grease barrel pump includes: a follower plate floating on an upper surface of grease accommodated in a grease barrel; a drive part coupled to the follower plate; a pumping part formed on the follower plate to discharge the grease; and an agitator installed below the follower plate and pushing the grease into a grease suction port, in which the pumping part includes: first and second pumping spaces formed adjacent to the drive unit; first and second grease suction ports extending from a lower surface of the follower plate to the first and second pumping spaces; first and second check valves coupled to the first and second pumping spaces; and first and second pump elements coupled to the drive part and reciprocating in the first and second pumping spaces, and at least one of the first and second pumping spaces has a grease recovery port.

However, 1) in the "multifunctional grease level follow-type electric grease barrel pump and the piping structure thereof" in the related art, it is difficult to suck the entire grease remaining in a lower portion of the grease barrel, so that a new type of grease barrel pump is developed through the improvement.

2) In the "multifunctional grease level follow-type electric grease barrel pump and the piping structure thereof" in the related art, the control function (1) only has a grease pump injection function, but may not widely apply a small amount of grease to a large area of a sliding surface (boom) required for special equipment such as cranes, and (2) due to characteristics of equipment such as hydraulic breakers, there is no function to continuously and periodically inject a very small amount of grease.

RELATED ART DOCUMENT

Patent Document (Patent Document 0001) Korean Unexamined Patent Publication No. 10-2023-0067147 (published on May 16, 2023), "Multifunctional grease level follow-type electric grease barrel pump and the piping structure thereof"
(Patent Document 0002) Korean Registered Patent No. 10-1689224 (published on Dec. 23, 2016), "Electric type grease barrel pump"
(Patent Document 0003) Korean Registered Patent No. 10-1364760 (published on Feb. 20, 2014), "Grease supply system of multifunctional excavator"

SUMMARY

To solve the above problem, an object of the present disclosure is to provide a multipurpose grease barrel pump for preventing a presence of residual grease inside a grease barrel, which 1) is based on a grease residue prevention type, 2) has a branch and shock prevention structure, 3) enables control (on/off) of a flow amount of the pump, 4) has a grease spray function, and 5) has a function of periodically or continuously injecting a very small amount of the grease and a typical function of discharging a large amount of the grease.

To achieve the above object, one aspect of the present disclosure provides a grease barrel pump for preventing a presence of residual grease with a grease spray function and a variable grease discharge function, in which the grease barrel pump includes: a main plate mounted on a grease barrel; a main cylinder extending downward from and communicating with the main plate; a follower plate vertically moving from an outer circumference of the main cylinder; and a power part formed on the main plate to transmit power into the main cylinder.

In this case, the main cylinder may include a body check coupled to an end of the main cylinder, and an inlet piston reciprocating in the body check, a body check conical inner wall may be formed in the body check, and a conical input valve may be formed at an end of the inlet piston, and a predetermined distance between the body check conical inner wall and the conical input valve may be maintained upon a vertical stroke of the inlet piston with respect to the body check.

In this case, the grease barrel pump may further include a distribution control part formed on the main plate to control a facility by distributing grease discharged from the main cylinder, in which the distribution control part may be formed with two discharge ports having different discharge amounts.

In this case, a flowmeter may be installed in the distribution control part to control the flow of the grease through the distribution control part when a flow amount that is equal to or greater (or less) than a predetermined amount flows.

In this case, a grease barrel protective cover may be integrally formed with the main plate to make close contact with the grease barrel at different heights.

In this case, when a pump is operated at a preset pressure or greater, the distribution control part may allow the grease inside a pipe of the distribution control part to be recovered into the follower plate.

In this case, the grease barrel pump may further include a stand for mounting the main plate so that the main plate is mounted upon replacement of the grease barrel, in which a grease barrel protective case for accommodating the grease barrel may be formed, and the grease barrel protective case may have a window having a structure enabling visual identification of a grease level.

According to the present disclosure, the multipurpose grease barrel pump for preventing a presence of residual grease inside a grease barrel, which may easily adjust a discharge amount of grease, is based on a grease residue prevention type, has a branch and shock prevention structure, enables control (on/off) of a flow amount of the pump, and has a grease spray function, a function of periodically or continuously injecting a very small amount of the grease, and a typical function of discharging a large amount of the grease.

DETAILED DESCRIPTION

Figure 1:
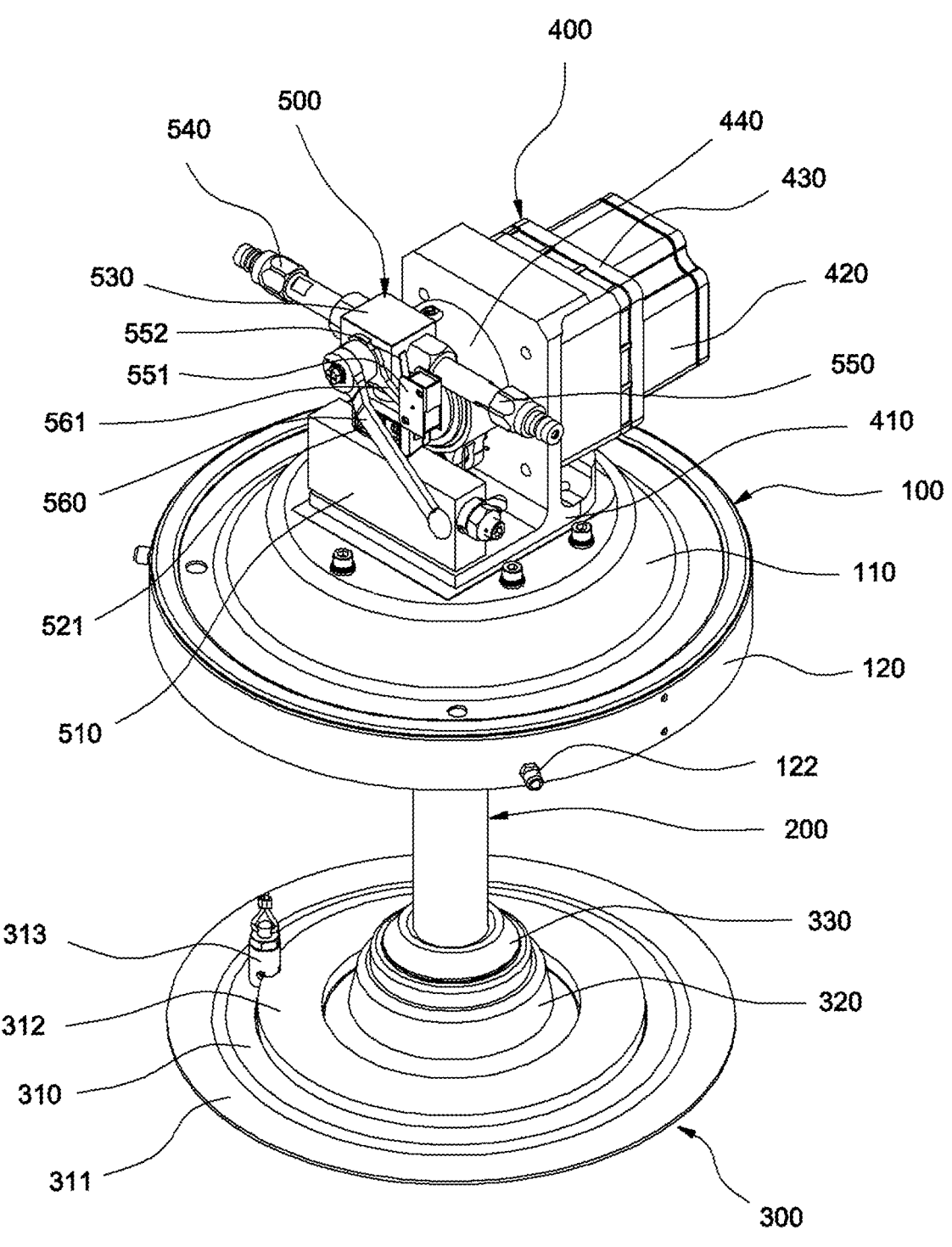
FIG. 1 is a perspective view of a grease barrel pump for preventing a presence of residual grease with a grease spray function and a variable discharge function according to an embodiment of the present disclosure.

The detailed description of the present disclosure will be described below with reference to the accompanying drawings showing specific embodiments in which the present disclosure may be embodied. These embodiments will be described in detail as sufficient to enable those skilled in the art to practice the present disclosure. It may be understood that the diverse embodiments of the present disclosure do not need to be mutually exclusive although they are different from each other. For example, the specific shapes, structures and characteristics disclosed herein may be implemented in other embodiments in relation to one embodiment without departing from the spirit and scope of the present disclosure. In addition, it may be understood that the positions or arrangements of individual constituent elements in each disclosed embodiment may be changed without departing from the spirit and scope of the present disclosure.

Accordingly, the detailed description described below is not intended to be taken as a restrictive meaning, but if it is properly described, the scope of the present disclosure is restricted only by the appended claims, together with all scopes equivalent to the claims. In the drawings, the similar reference symbols refer to the same or similar functions throughout several aspects.

The terms used in the present disclosure have been selected from currently widely used general terms in consideration of the functions in the present disclosure. However, the terms may vary according to the intention of one of ordinary skill in the art, case precedents, and the advent of new technologies. Also, for special cases, meanings of the terms selected by the applicant are described in detail in the description section. Accordingly, the terms used in the present disclosure are defined based on their meanings in relation to the contents discussed throughout the specification, not by their simple meanings.

When a part may "include" a certain constituent element, unless specified otherwise, it may not be construed to exclude another constituent element but may be construed to further include other constituent elements.

According to the present disclosure, the grease barrel pump for preventing a presence of residual grease with a grease spray function and a variable grease discharge function is intended to discharge grease without remaining the entire grease to a bottom of the grease barrel pump, regardless of a type of the typical centralized grease injection system or individual grease injection pump.

The grease barrel pump for preventing a presence of residual grease with a grease spray function and a variable grease discharge function according to the present disclosure is intended to confirm a fixed amount of grease injected into a grease injection site regardless of a grease distribution port, that is, a sequential distribution port, a single-pipe distribution port, and a double-pipe distribution port, and controls a system when the fixed amount is under or over-injected.

The grease barrel pump for preventing a presence of residual grease with a grease spray function and a variable grease discharge function according to the present disclosure has a plurality of discharge ports with different discharge amounts of grease, and may control a system and switch a direction of the grease discharge port with one lever operation or switch.

The grease barrel pump for preventing a presence of residual grease with a grease spray function and a variable grease discharge function according to the present disclosure includes a grease barrel protective cover and a grease barrel curve that are doubly installed and respectively coupled with different heights of passage even when the grease barrel protective cover and the grease barrel curve are fastened in order to fundamentally prevent insertion of foreign matters, and in the case of a barrel-replacement type barrel pump, the barrel pump includes a stand for easily replacing a barrel and has a window outside the grease barrel protective cover to visually confirm a presence of the residual grease in the grease barrel.

Hereinafter, the grease barrel pump for preventing a presence of residual grease with a grease spray function and a variable discharge function according to the present disclosure will be described in detail with reference to the accompanying drawings.

Figure 2:
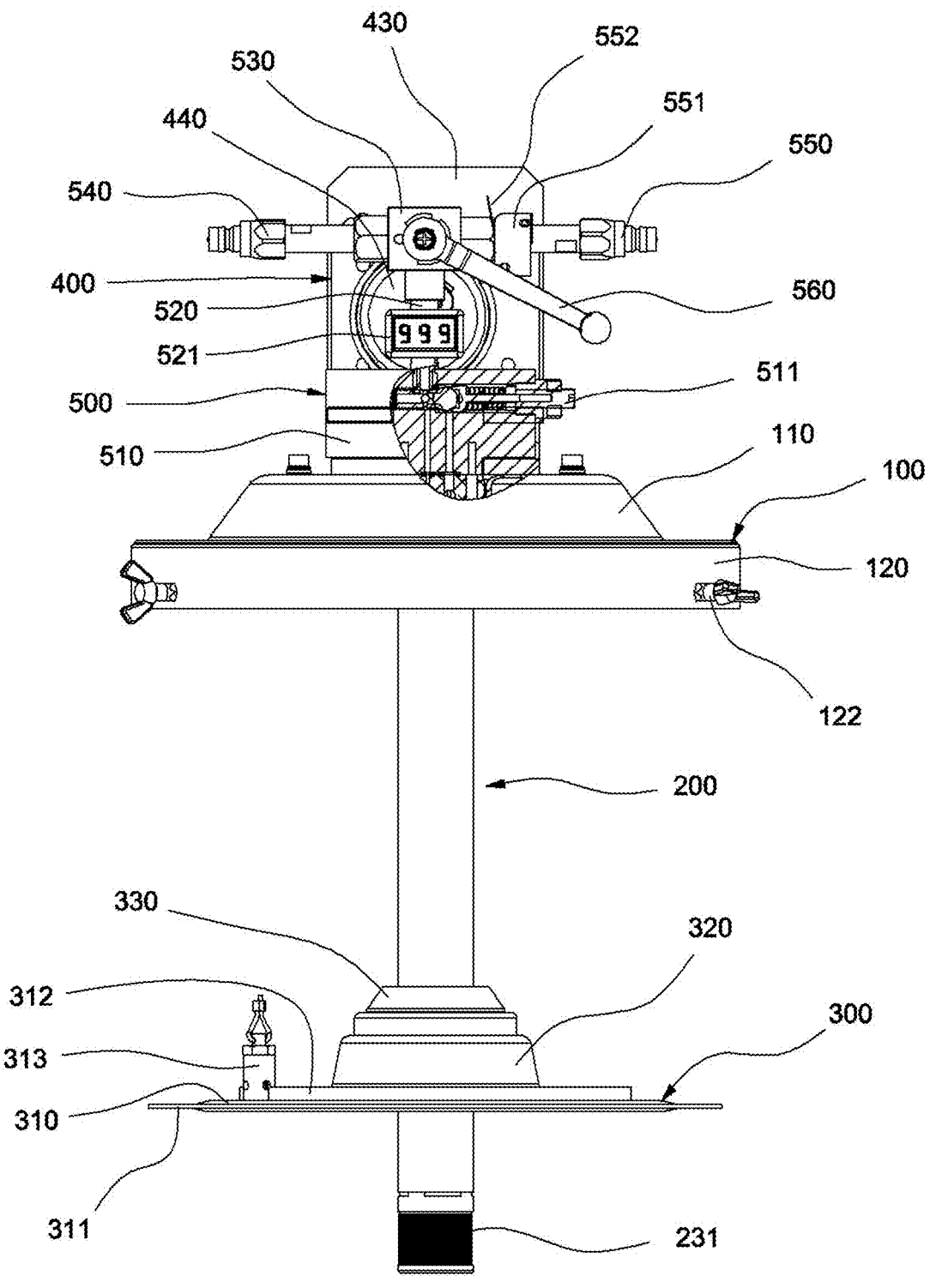
FIG. 2 is a side view of the grease barrel pump for preventing a presence of residual grease with a grease spray function and a variable discharge function according to the embodiment of the present disclosure, and is an exemplary view representing a part being cut out.
Figure 3:
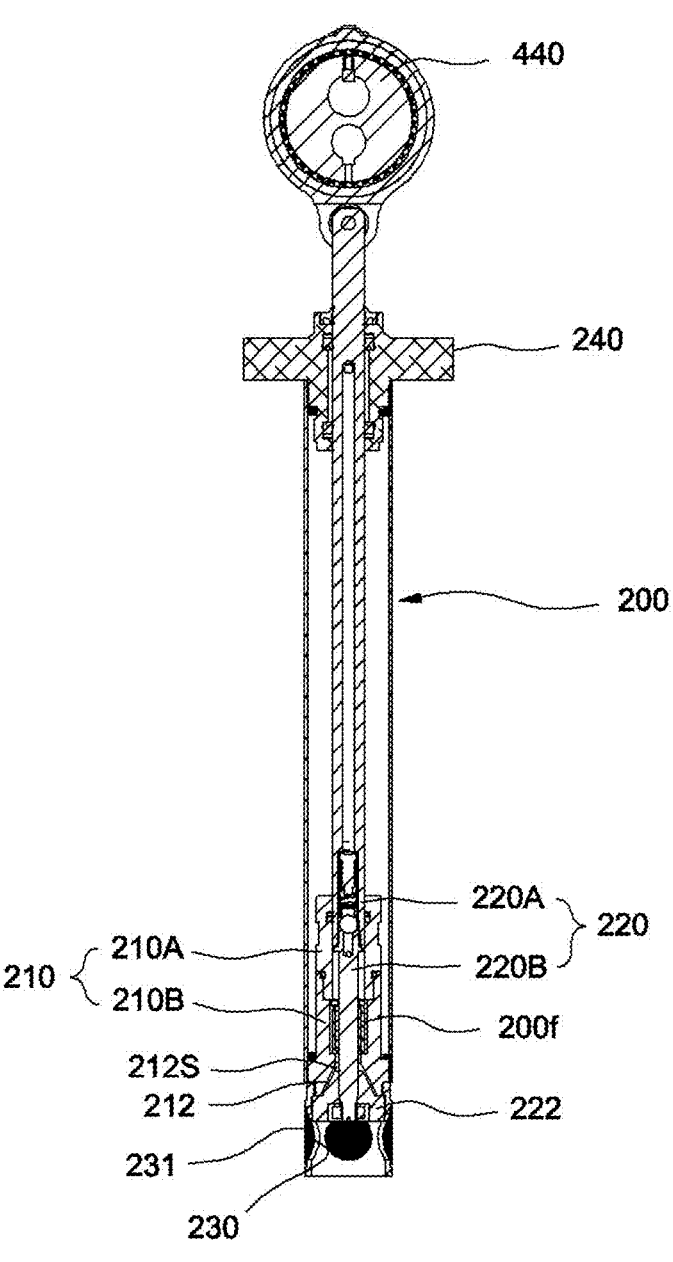
FIG. 3 is a sectional view of a main cylinder of the grease barrel pump for preventing a presence of residual grease with a grease spray function and a variable discharge function according to the embodiment of the present disclosure.
Figure 4:
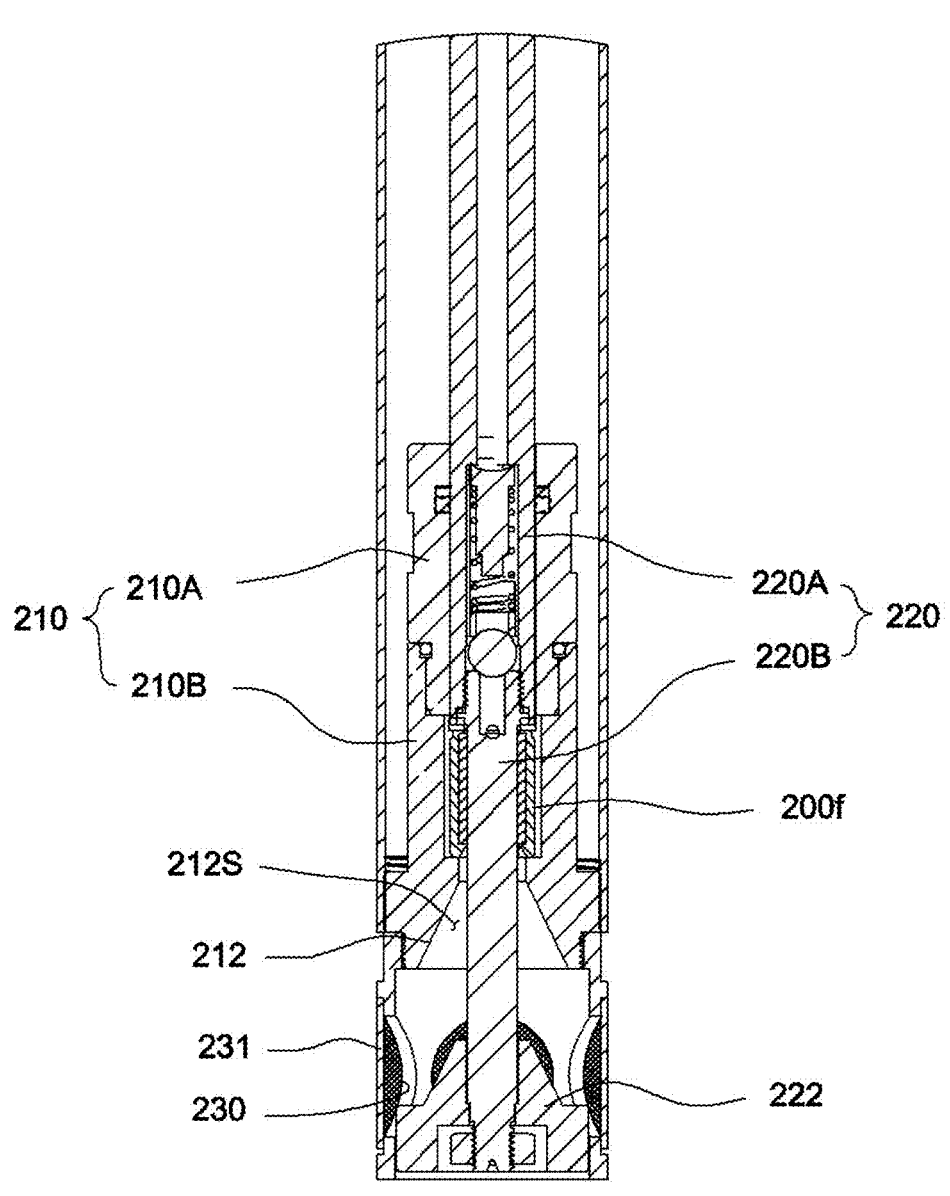
FIGS. 4 and 5 are exemplary views representing a vertical stroke of the main cylinder of the grease barrel pump for preventing a presence of residual grease with a grease spray function and a variable discharge function according to the embodiment of the present disclosure.
Figure 5:
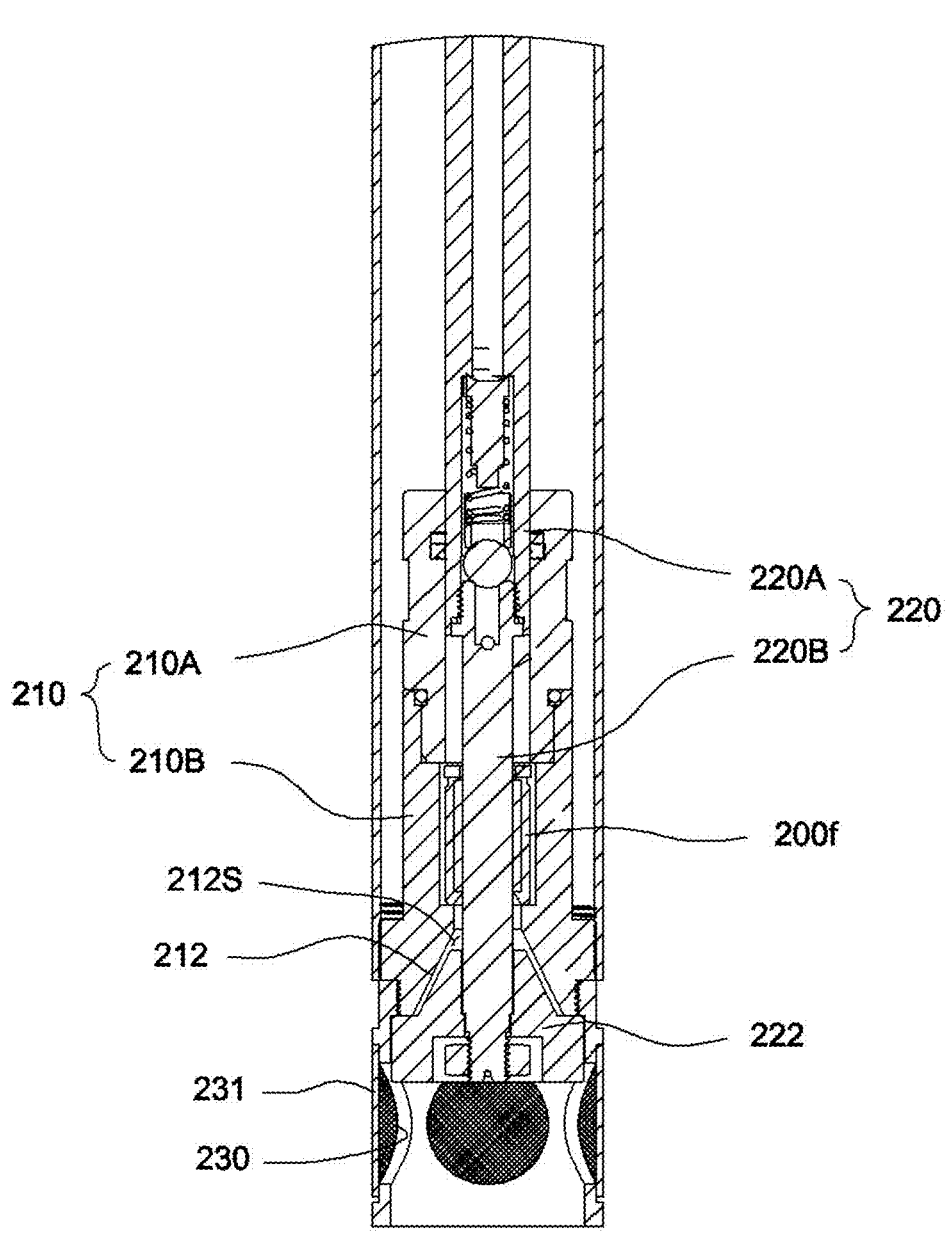
Figure 6:
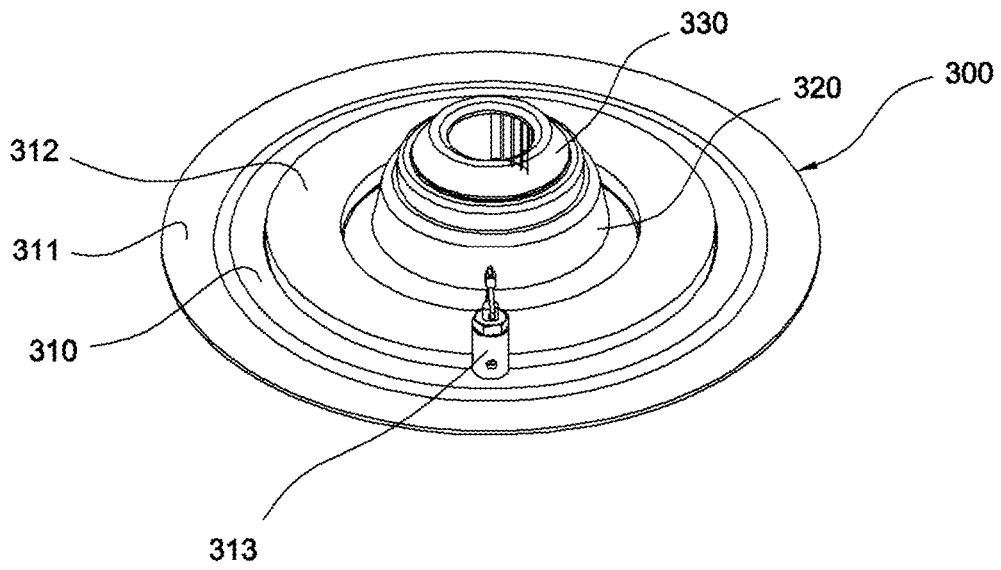
FIG. 6 is a perspective view of a follower plate of the grease barrel pump for preventing a presence of residual grease with a grease spray function and a variable discharge function according to the embodiment of the present disclosure.
Figure 7:
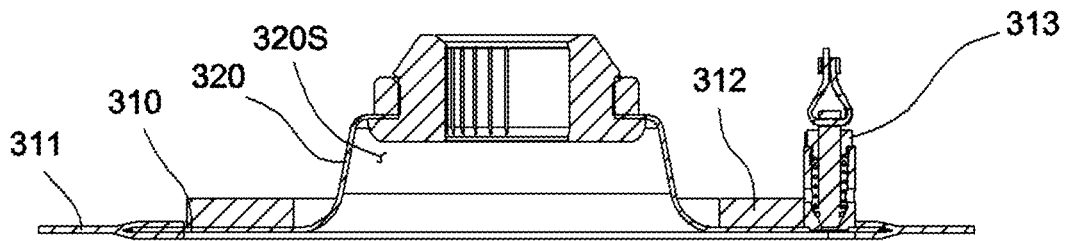
FIG. 7 is a sectional view of the follower plate of the grease barrel pump for preventing a presence of residual grease with a grease spray function and a variable discharge function according to the embodiment of the present disclosure.
Figure 8:
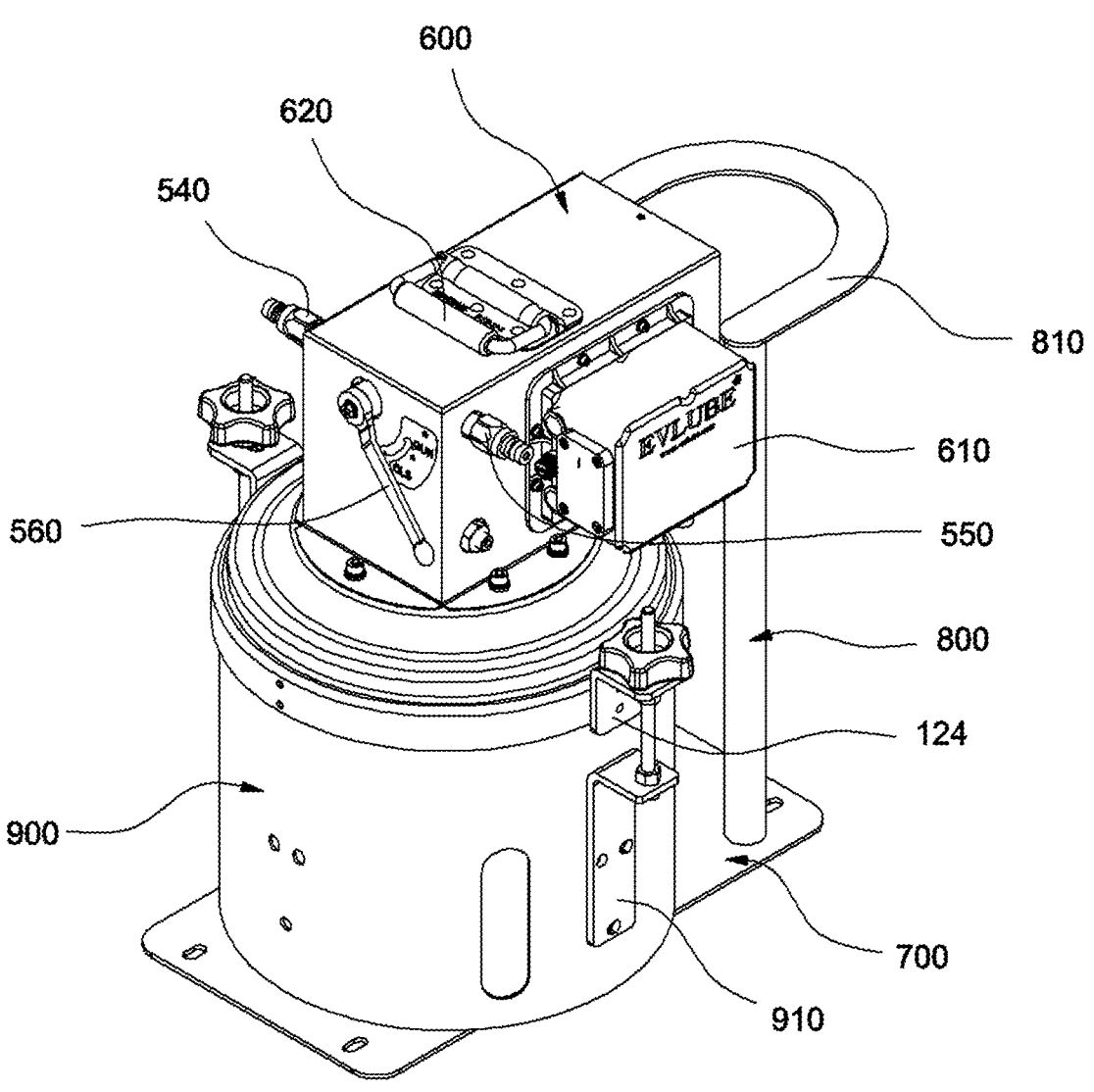
FIGS. 8 to 10 are exemplary views of additional members of the grease barrel pump for preventing a presence of residual grease with a grease spray function and a variable discharge function according to the embodiment of the present disclosure.

FIG. 1 is a perspective view of a grease barrel pump for preventing a presence of residual grease with a grease spray function and a variable discharge function according to an embodiment of the present disclosure, FIG. 2 is a side view of the grease barrel pump for preventing a presence of residual grease with a grease spray function and a variable discharge function according to the embodiment of the present disclosure, and is an exemplary view representing a part being cut out, FIG. 3 is a sectional view of a main cylinder of the grease barrel pump for preventing a presence of residual grease with a grease spray function and a variable discharge function according to the embodiment of the present disclosure, FIGS. 4 and 5 are exemplary views representing a vertical stroke of the main cylinder of the grease barrel pump for preventing a presence of residual grease with a grease spray function and a variable discharge function according to the embodiment of the present disclosure, FIG. 6 is a perspective view of a follower plate of the grease barrel pump for preventing a presence of residual grease with a grease spray function and a variable discharge function according to the embodiment of the present disclosure, FIG. 7 is a sectional view of the follower plate of the grease barrel pump for preventing a presence of residual grease with a grease spray function and a variable discharge function according to the embodiment of the present disclosure, and FIG. 8 is an exemplary view of a use of the grease barrel pump for preventing a presence of residual grease with a grease spray function and a variable discharge function according to the embodiment of the present disclosure.

As shown in FIG. 8, the grease barrel pump for preventing a presence of residual grease with a grease spray function and a variable discharge function according to the present disclosure includes: a main plate 100 mounted on a grease barrel GC; a main cylinder 200 extending downward from and communicating with the main plate 100; a follower plate 300 vertically moving from an outer circumference of the main cylinder 200; and a power part 400 formed on the main plate 100 to transmit power into the main cylinder 200. Meanwhile, the pump according to the present disclosure may further include a protective cover 600, a support part 700, a stand 800, and a grease barrel protective case 900.

The main plate 100 may be mounted on the grease barrel GC, and fixed or unfixed to an upper outer circumference of the grease barrel GC. As shown in FIGS. 1 and 2, the main plate 100 may largely include a main plate-cover part 110 and a main plate-grease barrel protective cover 120 extending downward from an outer circumference of the main plate-cover part 110.

The main plate 100 may have the main plate-grease barrel protective cover 120 integrally formed with the main plate-cover part 110. The main plate-grease barrel protective cover 120 may extend downward from an edge of the main plate-cover part 110 by a predetermined section, and may make close contact with the grease barrel at different heights through the main plate-grease barrel protective cover 120 extending downward by a predetermined section. The main plate-grease barrel protective cover 120 may have a tightening part 122.

Meanwhile, the main plate 100 may have the main plate-grease barrel protective cover 120 formed in two stages in a stepwise manner, in which an upper side of the main plate-grease barrel protective cover 120 may have a grease barrel pressing part 120A and a lower side thereof may have a grease barrel protective case pressing part 120B. In this case, the grease barrel pressing part 120A may press the grease barrel GC, and the grease barrel protective case pressing part 120B may strongly press the grease barrel protective case 900.

The main cylinder 200 may extend downward from and communicate with the main plate 100. In this case, as shown in FIGS. 3 to 5, the main cylinder 200 may include a body check 210 coupled to an end of the main cylinder 200, and an inlet piston reciprocating in the body check 210. In addition, the main cylinder 200 may be fixed to the main plate 100 through a main cylinder tube holder 240 formed thereon.

The body check 210 is preferably coupled to a lower end of the main cylinder 200. The body check 210 is preferably inserted and coupled to the main cylinder 200, and extends upward by a predetermined section. The body check 210 may be formed of two bodies of a first body check 210A and a second body check 210B, but may also formed as one body. A configuration in which the inlet piston 220 may vertically reciprocate through an inside of the body check 210 is provided.

The body check 210 may be formed with a body check conical inner wall 212. In this case, a space surrounded by the body check conical inner wall 212 may be referred to as a body check conical space 212S. The body check conical space 212S preferably has a conical shape. The body check conical space 212S communicates with a space that is formed through the inside of the body check 210, and grease compressed in the body check conical space 212S may be transferred upward through the body check conical space 212S. An inner circumference of a lower section of the body check 210 has a diameter larger than that of an outer circumference of the inlet piston 220, so that the grease is transferred upward through a space between the lower inner circumference of the body check 210 and the outer circumference of the inlet piston 220 at the beginning of introduction of the grease. In this case, a flow check 200f serving as a check valve may be formed between the lower inner circumference of the body check 210 and the outer circumference of the inlet piston 220. Meanwhile, a hole is formed at a predetermined height of the inlet piston 220 so that the grease is transferred into the inlet piston 220, and then an inner circumference of an upper section of the body check 210 makes contact with the outer circumference of the inlet piston 220.

The inlet piston 220 is coupled to a cam 440 to vertically reciprocate, and is inserted into the space formed through the body check 210 to reciprocate in the body check 210. The inlet piston 220 vertically passes through the body check 210, and is exposed while extending to an outside of a lower portion of the body check 210. The inlet piston 220 may be formed of two bodies of a first inlet piston 220A and a second inlet piston 220B, but may be also formed as one body.

A conical input valve 222 is formed at an end of the inlet piston 220. The conical input valve 222 has a shape corresponding to the body check conical space 212S, and preferably has a relatively small conical shape compared to the body check conical space 212S. The conical input valve 222 may include a lower cylindrical body part and an upper conical body part extending upward from the cylindrical body part, and a diameter of a lower end surface of the conical body part may be relatively smaller than a diameter of the cylindrical body part. Accordingly, a predetermined distance between the body check conical inner wall 212 and the conical input valve 222 may be maintained upon a vertical stroke of the inlet piston 220 with respect to the body check 210.

Meanwhile, four main cylinder-grease suction ports 230 may be formed in a lower outer circumference of the main cylinder 200. In addition, a main cylinder-filtration filter 231 may be formed to surround an outer circumference in which the main cylinder-grease suction port 230 is formed. The main cylinder-grease suction port 230 allows the grease to flow into the main cylinder 200, and the main cylinder-filtration filter 231 does not allow foreign matters to flow into the main cylinder-grease suction port 230. The main cylinder-grease suction port 230 is laterally formed through the main cylinder so that the grease conically collected in a follower plate-protrusion part space 320S may be easily sucked.

Meanwhile, in a grease pumping operation structure in the main cylinder 200, as shown in FIGS. 4 and 5, first, the grease is filtered by the main cylinder-filtration filter 231 and pure grease moves to an inner space of the main cylinder 200 through the main cylinder-grease suction port 230. In this case, as the inlet piston 220 moves upward by the cam 440, the input valve 222 coupled to the lower portion of the inlet piston 220 also moves upward. Thereafter, when the input valve 222 moves upward by a predetermined section, the grease is introduced into the body check conical space 212S and compressed between the input valve 222 and the body check conical inner wall 212. In this case, the compressed grease is transferred along an inner space of the body check 210 due to the compressed force. In this case, the grease is initially transferred to a space between an inner circumference of a conduit of the body check 210 and the outer circumference of the inlet piston 220. When the grease is transferred up to a predetermined height, the grease flows into the conduit inside the inlet piston 220 through a hole formed in the inlet piston 220, and is transferred upward along the conduit inside the inlet piston 220. Meanwhile, a check valve or the like may be installed inside the inlet piston 220 to prevent backflow.

In summary, the pump according to the present disclosure prevents a presence of residual grease from remaining inside the piston using the main cylinder 200, which has a structure of compressing a predetermined amount of the grease regardless of a stroke distance of the piston, by always compressing a discharge amount of the grease in proportion to a compression distance of the piston, and the main cylinder-filtration filter 231 is mounted on a side surface of the main cylinder-grease suction port 230 to fundamentally prevent the suction of foreign matters and allow only pure grease to be sucked. In addition, the pump according to the present disclosure has a structure capable of increasing a grease suction force and a discharge pressure through each conical component in the main cylinder 200.

The follower plate 300 vertically moves on the outer circumference of the main cylinder 200. As shown in FIGS. 6 and 7, the follower plate 300 includes a follower plate-flat part 310 and a follower plate-protrusion part 320 that protrudes upward in a longitudinal shape from a central portion of the follower plate-flat part 310.

A follower plate-seal 311 may be formed on an outer circumference of the follower plate 300. The follower plate-seal 311 is preferably formed at an outer edge of the follower plate-flat part 310. The follower plate-seal 311 is preferably formed of a soft rubber plate material. The follower plate-seal 311 makes contact with an inner circumference of the grease barrel GC when the pump according to the present disclosure is coupled to the grease barrel GC, and always blocks inflow of air between upper and lower sections of the follower plate 300. Therefore, the follower plate-seal 311 has a structure in which air pockets may not be generated in the grease inside the grease barrel.

A follower plate-weight 312 may be formed on the follower plate 300 to press the follower plate 300 by a predetermined weight. The follower plate-weight 312 is preferably formed in a ring shape to uniformly apply a weight to the entire surface of the follower plate 300.

A follower plate-air vent 313 may be formed on the follower plate 300. The follower plate-air vent 313 may have a structure capable of immediately removing the air when the air pockets are generated. In this case, when the grease is not discharged due to the air pockets remaining inside the grease, the air pockets may be simply and instantly removed through the follower plate-air vent 313. In addition, the follower plate-air vent 313 allows the follower plate 300 to be easily replaced when the follower plate 300 is replaced from the grease barrel GC to another grease barrel GC.

A follower plate-protrusion part space 320S is formed in the follower plate-protrusion part 320. The follower plate-protrusion part space 320S is formed at the center of the follower plate 300. The pump according to the present disclosure collects the grease in a conical shape through the space and laterally sucks the grease through the main cylinder-grease suction port 230 formed in the lower outer circumference of the main cylinder 200, so that the grease may be sucked without remaining in the center of the grease barrel GC.

A follower seal 330 is coupled to the follower plate-protrusion part 320. The follower seal 330 is coupled to the outer circumference of the main cylinder 200, and is preferably formed in a ring shape. In this case, it is appropriate that an inner circumference of the follower seal 330 has a size corresponding to the outer circumference of the main cylinder 200 so that the follower seal 330 makes close contact with the main cylinder 200 to enable vertical movement. Meanwhile, the follower seal 330 may be coupled while protruding upward from the follower plate-protrusion part 320.

In summary, in the pump according to the present disclosure, the follower plate 300 is installed inside the grease barrel to block a grease contact surface and the inflow of air, and the weight 312 of a predetermined weight or greater is installed on the follower plate 300, so that the pump according to the present disclosure continuously pushes a lower portion such that the size of the air pockets remaining inside the grease does not increase by a predetermined size or greater when the grease is sucked. Meanwhile, the follower plate-seal 311 is formed of a very thin and soft rubber plate on an edge of the end of the follower plate 300. The pump according to the present disclosure continuously blocks the inflow of air by specially manufacturing and installing the follower plate-seal 311 which always blocks the inflow of air regardless of a difference of the circumference size of the upper and lower portions of the grease barrel GC. The pump according to the present disclosure exerts a sealing function regardless of a difference in inner diameter between the upper and lower portions of the grease barrel based on the follower plate 300 through the follower plate-seal 311.

The power part 400 is formed on the main plate 100 to transmit power into the main cylinder 200. The power part 400 includes a power part fixing member 410, a motor 420, a gear part 430, and the cam 440.

The power part fixing member 410 is for fixing the power part 400 to the main plate 100. The motor 420 may receive electric power from the outside to generate power, and may transmit the power to the gear part 430. The gear part 430 transmits the power received from the motor 420 to the cam 440.

The cam 440 converts a rotational force received from the motor 420 into a vertical reciprocating motion and transmits the vertical reciprocating motion to the main cylinder 200. More specifically, the cam 440 is coupled to the inlet piston 220 and allows the inlet piston 220 to reciprocate vertically.

Meanwhile, the pump according to the present disclosure may further include a distribution control part 500 formed on the main plate 100 to distribute the grease discharged from the main cylinder 200 and control a facility.

The grease barrel pump for preventing a presence of residual grease with a grease spray function and a variable discharge function according to the present disclosure may further include the distribution control unit 500 having two discharge ports with different discharge amounts. In this case, the two discharge ports may be a high flow amount discharge port 540 and a low flow amount discharge port 550 or a grease spray discharge port.

The distribution control part 500 includes a distribution part 510. A distributor 511 may be coupled to the distribution part 510. The distribution control part 500 may allow the grease inside a pipe of the distribution control part 500 to be recovered into the follower plate 300 when the pump is operated at a preset pressure or greater. The distribution part 510 may be connected to a component such as a lever 560 and a switch 551 in a wired or wireless manner. The distributor 510 may control the discharge amount transferred to the high flow amount discharge port 540 and the low flow amount discharge port 550.

A flow path 520 may be formed in an upper portion of the distribution part 510. A flowmeter 521 is installed in the flow path 520 of the distribution control part 500, and when a flow amount that is equal to or greater (or less) than a predetermined amount flows, a user may control the flow of the grease through the distribution control part 500. A general flowmeter calculates only a flow amount (volume metering), but the flowmeter 521 according to the present disclosure may confirm (total discharge amount)/(number of times of operation or operation time) set in the distribution control unit 500. In this case, the set discharge amount is to set the flow amount to be discharged from the entire pump. When a control function is set in the flowmeter 521 and a flow amount of (discharge amount)/(number of times of operation or operation time) or greater (or less) set in the distribution control unit 500 is measured, a controller of the grease injection system is immediately stopped to protect the entire system. In this case, the corresponding abnormal distribution port or lubrication site is maintained in advance, thereby preventing occurrence of a large-scale accident of equipment, minimizing a loss of grease due to pipe damage, and always maintaining a proper lubrication state.

A three-way valve 530 is connected to an upper portion of the flow path 520. The high flow amount discharge port 540 and a low flow amount port 550 may be connected to the three-way valve 530 to transfer different amounts of grease to different sites. In addition, a grease discharge function may be selected.

Meanwhile, a switch 551 may be formed on the lower flow amount discharge port 550. In addition, a switch button 552 may be formed on the switch 551. The switch is LM s/w, and has a function of controlling the discharge amount between the high flow amount discharge port 540 and the low flow amount discharge port 550. Accordingly, the switch may be connected to a specific application of an external device, and may control the discharge amount of grease discharged through the high flow amount discharge port 540 and the low flow amount discharge port 550 with a value preset in an application. In addition, a grease spray function may be selected.

In this case, the three-way valve 530 may be formed with the lever 560 so that the user may control the movement of grease. The lever 560 is rotated so as to change a grease discharge direction. The lever 560 may adjust a conduit in the three-way valve 530 to directly adjust the grease discharge direction, the discharge amount, or the spray function with respect to the high flow amount discharge port 540 and the low flow amount discharge port 550.

Meanwhile, a lever extension member 561 may be formed on the lever 560, and the lever extension member 561 may be spaced apart or released from the switch button 552 of the switch 551 when the lever 560 is rotated, thereby operating the switch button 552 of the switch 551. The lever extension member 561 may operate the switch button 552 of the switch 551, that is, the LM s/w, according to a rotation angle to simultaneously change a mode of the controller.

In a multifunctional grease pump, an electric high-pressure directional sulfur valve is typically used to switch a direction of the grease discharge port or open/close the grease discharge port. However, the pump according to the present disclosure may be visually controlled more inexpensively and reliably through the components such as the flowmeter 521, the lever 560, the lever extension member 561, the switch 551, and the switch button 552, and may be manufactured at a low cost without re-inspection confirmation. Accordingly, the lever 560 may be operated to change the grease discharge direction and the discharge amount, and when the rotation angle reaches a predetermined rotation angle, the switch button 552 of the switch 550 may be operated to change a control mode of the grease injection controller.

Figure 9:
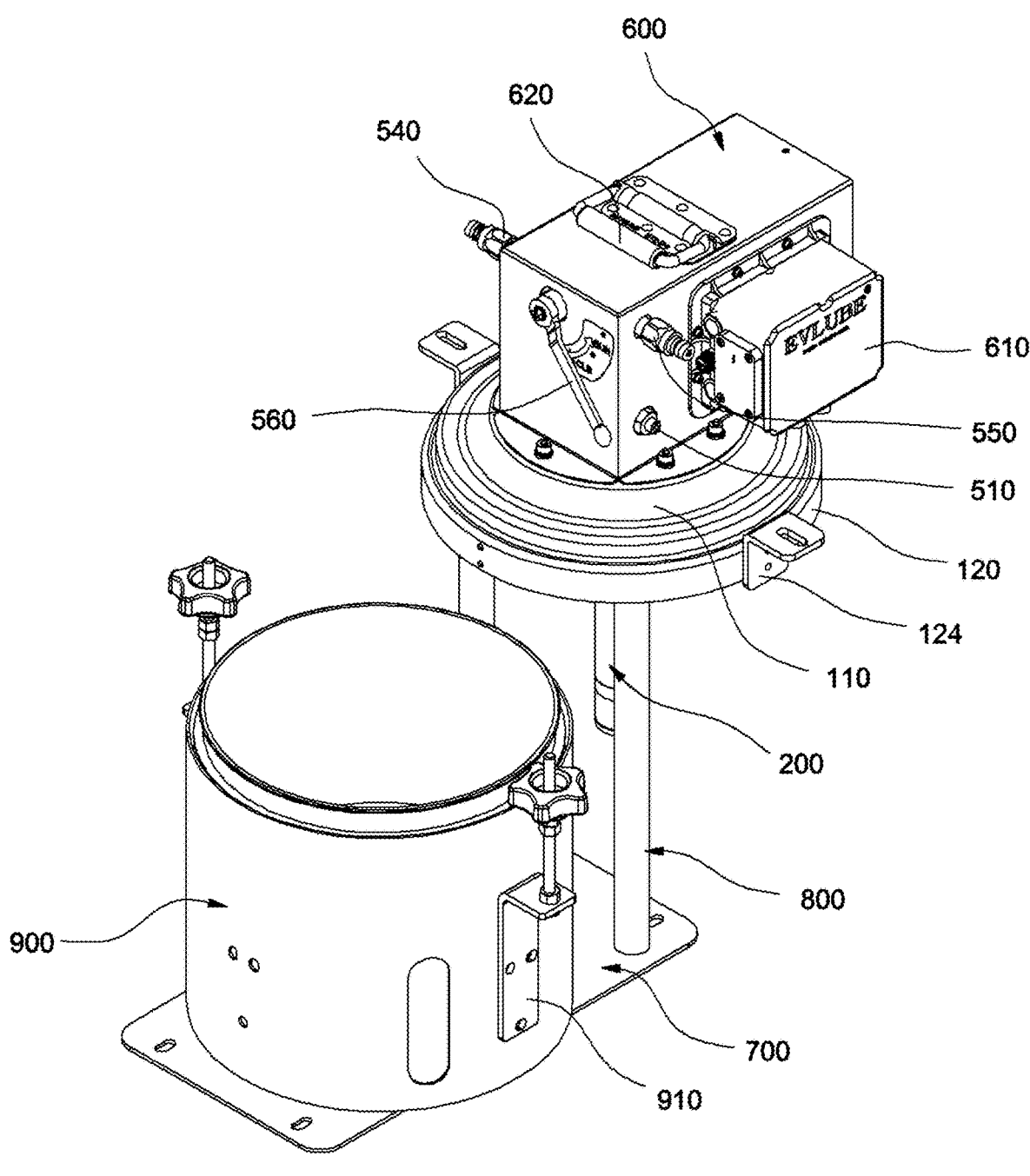
Figure 10:
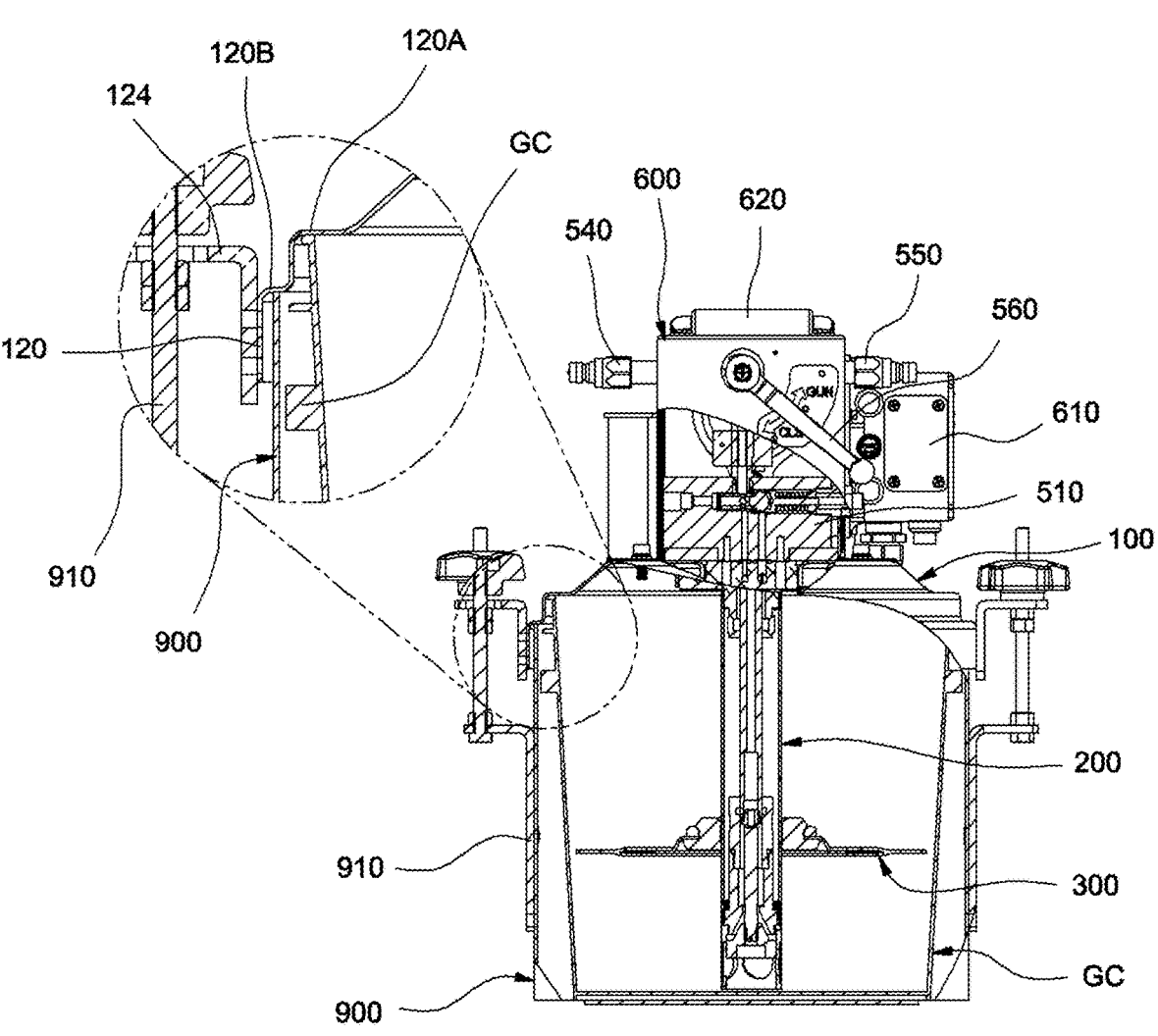

Meanwhile, according to the present disclosure, in addition to the grease barrel pump for preventing a presence of residual grease with a grease spray function and a variable discharge function, additional members may be provided as shown in FIGS. 8 to 10.

First, the pump according to the present disclosure may include the protective cover 600 for covering the drive part 400 and the distribution control part 500 from the outside. In the protective cover 600, the lever 560 is exposed to the outside, and the high flow amount discharge port 540 and the low flow amount discharge port 550 are exposed to the outside. Meanwhile, the distribution part 510 is also partially exposed to the outside. Meanwhile, a controller 610 may be formed on one side of the protective cover 600, and a handle 620 may be formed on an upper portion of the protective cover 600.

Meanwhile, the pump according to the present disclosure may include a support part 700, a stand 800 extending upward from one side of the support part 700, and a grease barrel protective case 900 coupled to an upper portion of the support part 700.

The support part 700 preferably has a rectangular shape. In this case, the stand 800 extends upward from the support part 700, and the stand 800 may include two columns and a half-moon-shaped stand 810 formed on tops of two columns.

The grease barrel protective case 900 may be mounted on the support part 700. A grease barrel protective case-fastening part 910 may be formed on an outer circumference of the grease barrel protective case. In this case, a main plate-fastening part 124 may be formed on the outer circumference of the main plate 100, and the grease barrel protective case-fastening part 910 formed on the grease barrel protective case 900 and the main plate-fastening part 124 may be coupled to each other and firmly fixed to each other.

When the pump according to the present disclosure is simply mounted on the grease barrel GC, a coupling force is weak, so that a sufficient pressure is not applied, and thus the grease barrel GC is accommodated in the grease barrel protective case 900, and the grease barrel protective case 900 and the upper and lower portions of the main plate 100 are fixedly pressed so that the grease barrel GC does not move. In this case, the grease barrel pressing part 120A fixedly presses the grease barrel, and the grease barrel protective case pressing part 120B fixedly presses the grease barrel protective case 900, so that the grease barrel pressing part 120A and the grease barrel protective case pressing part 120B may be fixed to components, respectively.

A window having a structure capable of visually identifying a grease level may be formed on the grease barrel protective case 900. In this case, when the grease barrel GC accommodated in the grease barrel protective case 900 is formed of a transparent material, the grease level may be visually identified through the window of the grease barrel protective case 900.

The pump according to the present disclosure may be applied to both a fixed pump type or to a movable pump type, and the discharge amount and pressure of the pump are always relative to those of other discharge ports and are contrasted with a large discharge amount-low discharge pressure and a small discharge amount-large discharge amount. As for the application scope, the pump according to the present disclosure is applicable and economical to all equipment in which one equipment has a different lubrication injection amount and injection period.

That is, the pump according to the present disclosure may be applied to a concrete pump car, a crane & cargo crane, an excavator and various facilities attached thereto (Breaker & attachments, etc), a rock drill machine, and other special mechanical equipment (etc construction & mining equipment), which have different lubrication injection amounts and injection cycles. In addition, in equipment having a rectangular or cylindrical sliding boom having a different step size, such as a crane, it is difficult to apply grease because the size of the sliding surface and the area of the sliding surface are different, but it is very economical to select and use the pump according to the present disclosure as a spray function.

The grease discharge amount is controlled by automatic adjustment when the controller selects the number of rotations of the drive part 400.

When the main cylinder 200 communicating with the grease pump main plate 100 serves as a stand during barrel replacement, a serious problem occurs due to attachment of foreign matters. Therefore, the half-moon-shaped stand 810 on a back surface of the grease barrel protective case 900 performs the function.

The pump according to the present disclosure has 1) two discharge ports of the high flow amount discharge port 540 and the low flow amount discharge port 550; 2) the grease barrel pressing part 120A and the grease barrel protective case pressing part 120B vertically formed on the pump main plate 100 so that grease barrel GC and the grease barrel protective case 900 may be pressed, respectively, and 3) the main plate-fastening part 124 and the grease barrel protective case-fastening unit 910 which fasten the pump main plate 100 and the grease barrel protective case 900 to each other, in which 4) the pump controller may be attached to or detached from the pump main plate, 5) the grease barrel protective case 900 and the main frame may not be always integrated with the pump, but may be separately coupled as necessary, and 6) a sprayer gun and a nozzle, which are generally used in the grease spray function, may be necessarily attached to the pump.

The pump according to the present disclosure relates to a barrel-replacement type grease barrel pump 1) which is a grease barrel pump only available for a breaker with a function of injecting a very small amount of grease (discharge of a small amount of grease), and is a pump (currently widely applied) used in 2) a centralized progressive grease injection system (discharge of a smaller amount of grease), 3) a case where a typical discharge amount of grease using a grease gun is achieved by using a classic manual grease injector, a single type automatic grease injector pump, or a double-pipe automatic grease injector (for double-pipe, single-pipe, or gun), 4) a case where the grease spray function is only available for a boom crane and a rope crane (for boom crane and rope crane only), and 5) a case where a large amount of grease is discharged when the grease is replenished in refillable grease barrel of the existing centralized system. The above functions may be performed through the components such as the controller 610 and the distribution control part 500.

When the grease barrel pump for preventing a presence of residual grease with a grease spray function and a variable discharge function according to the present disclosure selects a function of a pump controller signal to select a function of equipment as a variable discharge pump or a function of the grease pump as a manual lever, 1) a very small amount of grease is periodically or continuously injected to the breaker only when the breaker is operated. In addition, when the grease barrel pump for preventing a presence of residual grease with a grease spray function and a variable discharge function according to the present disclosure selects a function of the pump controller signal to select a function of equipment as a variable discharge pump or a function of the grease pump as a manual lever, 1) a very small amount of grease is periodically or continuously injected to the crane only when the breaker is operated.

As described above, a refill type system pump is used as the grease pump type, but in the replenishment of the grease in the central system refill type pump after using the grease, 1) it takes a lot of time to inject the grease using a manual gun or an air grease pump without a special grease injector, and 2) when a large grease pump is used to reduce the time and cost of refilling the grease, the cost is excessive and very few grease pumps satisfying conditions are almost impossible to use, but 3) when a barrel-replacement type pump is used, it is possible to significantly reduce the time and cost by replacing the commercially available grease barrel when the entire amount of grease is consumed, 4) the injection method and injection amount of grease are variously required depending on the type of equipment, so that it is impossible to solve the problem with the grease pump having one simple function, and 5) the heavy equipment usually moves long and short distances and usually has one main function and a main function driving function, so that it is required to change the grease injection system, but there is no grease pump system of such a structure on the market, and thus 6) a pump having a multifunctional structure is continuously being developed for patenting.

Accordingly, one aspect of the present disclosure states that a multipurpose grease barrel pump for preventing a presence of residual grease inside a grease barrel, which may easily adjust a discharge amount of grease, is developed, in which the multipurpose grease barrel pump includes a main plate, a main cylinder, and a follower plate vertically moving on an outer circumference of the main cylinder, is based on a grease residue prevention type, has a branch and shock prevention structure, enables control (on/off) of a flow amount of the pump, and has a grease spray function, a function of periodically or continuously injecting a very small amount of the grease, and a typical pump function of discharging a large amount of the grease.

Although the present disclosure has been described together with the accompanying drawings, it is only one embodiment among various embodiments including the gist of the present disclosure, and an object thereof is to enable those skilled in the art to easily implement the present disclosure, and it is clear that one aspect of the present disclosure is not limited to the above-described embodiments. Accordingly, the scope of protection of the present disclosure may be interpreted by the following claims, and all technical ideas within the scope equivalent thereto by change, substitution, substitution, and the like. within the scope not departing from the gist of the present disclosure will be included in the rights of the present disclosure. In addition, it is clarified that some components of the drawings are provided to more clearly explain the configuration and are exaggerated or reduced than the actual configuration.

What is claimed is:

1. A grease barrel pump for preventing a presence of residual grease with a grease spray function and a variable grease discharge function, the grease barrel pump comprising:

a main plate mounted on a grease barrel;

a main cylinder extending downward from and communicating with the main plate;

a follower plate vertically moving from an outer circumference of the main cylinder; and a power part formed on the main plate to transmit power into the main cylinder, wherein the main cylinder includes a body check coupled to an end of the main cylinder, and an inlet piston reciprocating in the body check, wherein the body check includes a body check conical inner wall and a body check conical space is formed by the body check conical inner wall, wherein a conical input valve is formed at an end of the inlet piston and the conical input valve includes a cylindrical body part and a conical body part, wherein the conical body part is formed in a conical shape that is smaller than the body check conical space so that the conical body part is received in the body check conical space, and a diameter of a lower end surface of the conical body part is smaller than a diameter of the cylindrical body part, such that a predetermined distance between the body check conical inner wall and the conical input valve is maintained during a vertical stroke of the inlet piston with respect to the body check.

2. The grease barrel pump of claim 1, further comprising a distribution control part formed on the main plate to control a facility by distributing grease discharged from the main cylinder, wherein the distribution control part is formed with two discharge ports having different discharge amounts.

3. The grease barrel pump of claim 2, wherein a flowmeter is installed in the distribution control part to control a flow of the grease through the distribution control part when a flow amount that is equal to or greater (or less) than a predetermined amount flows.

4. The grease barrel pump of claim 2, wherein, when the pump is operated at a preset pressure or greater, the distribution control part allows the grease inside a pipe of the distribution control part to be recovered into the follower plate.

5. The grease barrel pump of claim 1, wherein a grease barrel protective cover is integrally formed with the main plate to make close contact with the grease barrel at different heights.

6. The grease barrel pump of claim 1, further comprising a stand for mounting the main plate so that the main plate is mounted during replacement of the grease barrel, wherein a grease barrel protective case for accommodating the grease barrel is formed, and the grease barrel protective case has a window having a structure enabling visual identification of a grease level.

7. The grease barrel pump of claim 1, wherein, when either a pump controller signal selecting an equipment function as a variable discharge pump or a function of the grease pump as a manual lever is activated, 1) a very small amount of the grease is periodically or continuously injected into a breaker only when the breaker is operated.

8. The grease barrel pump of claim 1, wherein, when either a pump controller signal selecting an equipment function as a variable-discharge pump or a function of the grease pump as a manual lever is activated, 1) a very small amount of the grease is periodically or continuously injected into a crane only when a breaker is operated.

*    *    *    *    *